US010192655B2

(12) United States Patent
Newsome

(10) Patent No.: US 10,192,655 B2
(45) Date of Patent: Jan. 29, 2019

(54) ANISOTROPIC WIRE HARNESS

(71) Applicant: HIGHLAND INDUSTRIES, INC., Kernersville, NC (US)

(72) Inventor: James Rollings Newsome, Cheraw, SC (US)

(73) Assignee: HIGHLAND INDUSTRIES, INC., Kernersville, NC (US)

( * ) Notice: Subject to any disclaimer, the term of this patent is extended or adjusted under 35 U.S.C. 154(b) by 0 days.

(21) Appl. No.: 15/726,461

(22) Filed: Oct. 6, 2017

(65) Prior Publication Data

US 2018/0033521 A1  Feb. 1, 2018

Related U.S. Application Data

(63) Continuation-in-part of application No. 15/498,553, filed on Apr. 27, 2017, now Pat. No. 9,869,412, which is a continuation-in-part of application No. 14/502,079, filed on Sep. 30, 2014, now Pat. No. 9,664,310.

(51) Int. Cl.
| | |
|---|---|
| *F16L 9/18* | (2006.01) |
| *H01B 7/18* | (2006.01) |
| *H01B 7/00* | (2006.01) |
| *F16L 9/147* | (2006.01) |

(52) U.S. Cl.
CPC .......... *H01B 7/1805* (2013.01); *H01B 7/0045* (2013.01); *H01B 7/183* (2013.01); *F16L 9/147* (2013.01); *H01B 7/1865* (2013.01)

(58) Field of Classification Search
CPC ...... H01B 7/0045; H01B 7/1865; F16L 9/147

USPC .... 138/123–127, 137, 140; 428/36.9, 36.91; 174/107, 106 R
See application file for complete search history.

(56) References Cited

U.S. PATENT DOCUMENTS

| | | | |
|---|---|---|---|
| 2,514,905 | A | 7/1950 | Solero |
| 3,790,438 | A | 2/1974 | Lewis et al. |
| 3,856,052 | A | 12/1974 | Feucht |
| 3,866,633 | A | 2/1975 | Taylor |
| 4,007,070 | A | 2/1977 | Busdiecker |
| 4,320,160 | A | 3/1982 | Nishimura et al. |
| 4,488,577 | A | 12/1984 | Shilad et al. |
| 4,510,974 | A | 4/1985 | Natori et al. |
| 4,698,260 | A | 10/1987 | Sasaki et al. |
| 4,898,212 | A | 2/1990 | Searfoss et al. |
| 4,929,478 | A * | 5/1990 | Conaghan ............... F16L 57/06 138/103 |
| 5,052,444 | A | 10/1991 | Messerly et al. |
| 5,261,462 | A | 11/1993 | Wolfe et al. |

(Continued)

*Primary Examiner* — Patrick F Brinson
(74) *Attorney, Agent, or Firm* — Tuggle Duggins P.A.; Blake Hurt

(57) ABSTRACT

A wire harness including a number of wires, an outer sheath layer, and an anisotropic fabric positioned between the wires and outer sheath is provided. The anisotropic fabric is formed from combining a number of more rigid, monofilament fill strands and a number of less rigid multifilament warp strands. The fill strands may be formed from a single filament of at least five hundred fifty (550) denier while the warp strands may be formed from a series of polyester threads of at least two hundred (200) denier. The anisotropic layer permits limited rotation of the inner wires relative to the outer sheath when exposed to friction and pressure and is not subjected to significant creep during use.

16 Claims, 6 Drawing Sheets

(56) References Cited

U.S. PATENT DOCUMENTS

| | | | |
|---|---|---|---|
| 5,413,149 A | 5/1995 | Ford et al. | |
| 5,843,542 A | 12/1998 | Brushafer et al. | |
| 5,939,216 A | 8/1999 | Kameda et al. | |
| 6,508,276 B2* | 1/2003 | Radlinger | F16L 11/02 138/124 |
| 7,216,678 B2* | 5/2007 | Baer | D03D 3/08 139/383 R |
| 7,600,539 B2* | 10/2009 | Malloy | D03D 15/02 139/384 A |
| 8,322,382 B2 | 12/2012 | Slagsvold et al. | |
| 8,678,042 B2 | 3/2014 | Quigley et al. | |
| 8,701,255 B1 | 4/2014 | Cavallaro | |
| 8,701,716 B2* | 4/2014 | Kashihara | D03D 1/0041 139/384 R |
| 8,925,592 B2* | 1/2015 | Itoh | B60R 16/02 138/123 |
| 9,404,204 B2* | 8/2016 | Itoh | B60R 16/02 |
| 9,416,469 B2* | 8/2016 | Woodruff | D03D 3/02 |
| 2011/0275268 A1* | 11/2011 | Harris | H02G 3/0481 442/319 |
| 2012/0174358 A1 | 7/2012 | Cavallaro | |
| 2014/0262478 A1* | 9/2014 | Harris | H05K 9/009 174/393 |

* cited by examiner

US 10,192,655 B2

ANISOTROPIC WIRE HARNESS

This is a continuation-in-part of and claims benefit under pending prior application Ser. No. 15/498,553, filed 27 Apr. 2017 which is a continuation-in-part of and claims benefits under prior application Ser. No. 14/502,079 filed 30 Sep. 2014, now U.S. Pat. No. 9,664,310 issued 30 May 2017, both of which are incorporated by reference in their entirety herein.

FIELD OF THE INVENTION

The invention herein pertains to unidirectional-flexing fabrics and particularly pertains to an anisotropic wire harness liner.

DESCRIPTION OF THE PRIOR ART AND OBJECTIVES OF THE INVENTION

Reinforced housings conduits, pipes, and the like for carrying materials such as water, carbon dioxide, and oil and gas acquisition or transportation is known in the art. Further, it is known to group one or more wires into bundles, often times referred to as a wire harness or simply harness, and then to encapsulate the bundle in a housing or sheath to prevent damage to the wire harness and inadvertent connections and grounding. Typically, these reinforced harness assemblies comprise an inner section comprised of one or more wires, an intermediate layer protecting the individual wires or predetermined wire groupings, and an outer layer or shield. The intermediate and outer layers may be formed from a material such as high-density polyethylene that is resistant to degradation such as corrosion, or a more structurally rigid material such as woven metal. Although encapsulation and/or structural sleeves have long been a solution to preventing wire damage, the specific operating environment and performance requirements, particularly as it pertains to the manufacture, transportation, and installation of high-capacity wire harnesses necessitate a more flexible solution.

The use of one or more interior and/or exterior sleeves or sheaths, typically formed out of one or more polymeric material(s) permit limited flexing of the harness while simultaneously affording structural stability during transportation and installation. However, a significant problem known as "creep" arises when the inner and outer layers are subjected to significant heat and pressure typically associated with subterranean work environments. Given that the woven jackets are not restrictive to longitudinal lengthening, the harness layers can become distressed and often degrade in a short period of time, a problem common when such solutions are deployed to reinforce piping. Further, because separation between the jacket weave may also occur during creep, the jacket material no longer bestows the desired structural support. Efforts to restrict the creep of the jacket, for example by utilizing polymeric films or sheets formed from materials such as biaxially-oriented polyethylene terephthalate (Mylar®) have proved ineffective.

Thus, in view of the problems and disadvantages associated with prior art devices, the present invention was conceived and one of its objectives is to provide an anisotropic wire harness liner to prevent the creep of a woven jacket or plastic sleeve positioned between inner and outer harness layers.

It is another objective of the present invention to provide an anisotropic wire harness liner comprised of a more rigid monofilament fill strand and a less rigid warp strand.

It is still another objective of the present invention to provide an anisotropic wire harness liner with a monofilament polyester fill strand.

It is yet another objective of the present invention to provide an anisotropic wire harness liner with a two hundred twenty (220) denier, thirty-four (34) thread warp strand.

It is a further objective of the present invention to provide an anisotropic wire harness liner with a hot melt fusion selvage.

It is still a further objective of the present invention to provide an anisotropic web formed from a fill material defining a high bending or flexibility modulus.

It is yet a further objective of the present invention to provide an anisotropic web formed from a warp material defining a lower bending or flexibility modulus compared to the fill material.

It is another objective of the present invention to provide an anisotropic wire harness liner that is longitudinally flexible but laterally stiff, allowing the wire harness to be rolled when not in use.

It is a further objective of the present invention to provide an anisotropic wire harness liner in combination with a woven jacket formed from a polymeric or fiberglass material.

Various other objectives and advantages of the present invention will become apparent to those skilled in the art as a more detailed description is set forth below.

SUMMARY OF THE INVENTION

The aforesaid and other objectives are realized by providing an anisotropically flexible liner that is flexible along a longitudinal axis but stiffer along a lateral axis. This liner is incorporated into a wire harness defined by a plurality of plastic sheathed wires collected into a group and wrapped with the liner before being encapsulated in an exterior polymeric coating or shield. The wire harness liner is formed from a web woven from a plurality of laterally oriented warp strands and a number of longitudinally oriented monofilament fill strands. The warp strands are formed from two hundred twenty (220) denier, thirty-four (34) thread count strands, while the fill strands are formed from polyester monofilament threads with a one-quarter (0.25) millimeter diameter strand. In use, the exterior encapsulation permits a limited amount of wire harness flexibility, including the ability to roll the wire harness during storage and transportation, but the pipe liner resists heat and temperature common to the work environment of an oil and gas pipe, clearing the jacket to prevent buckling and degradation of the pipe exterior while resisting creep.

DETAILED DESCRIPTION OF THE PREFERRED EMBODIMENT AND OPERATION OF THE INVENTION

Figure 1:
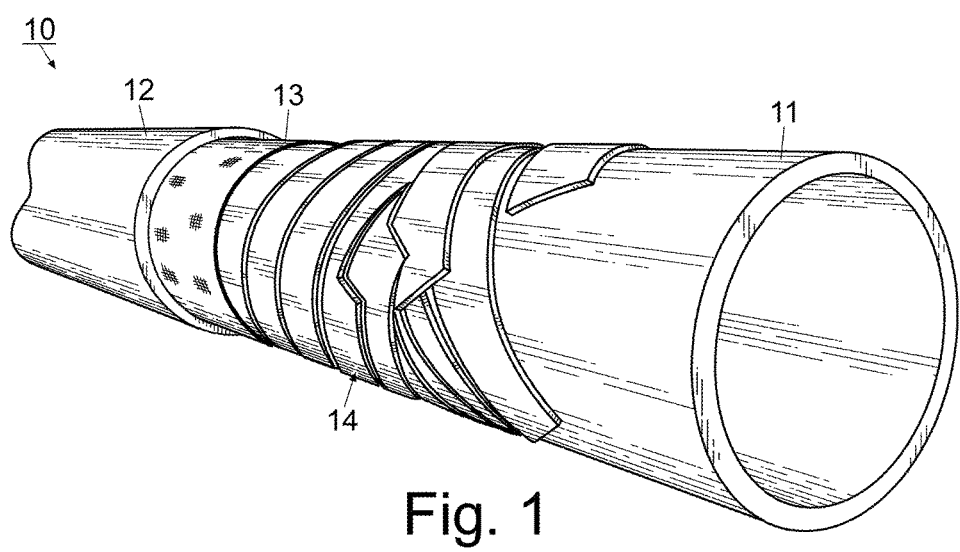
FIG. 1 shows a side perspective view of a pipe in a first position with an anisotropic liner.
Figure 2:
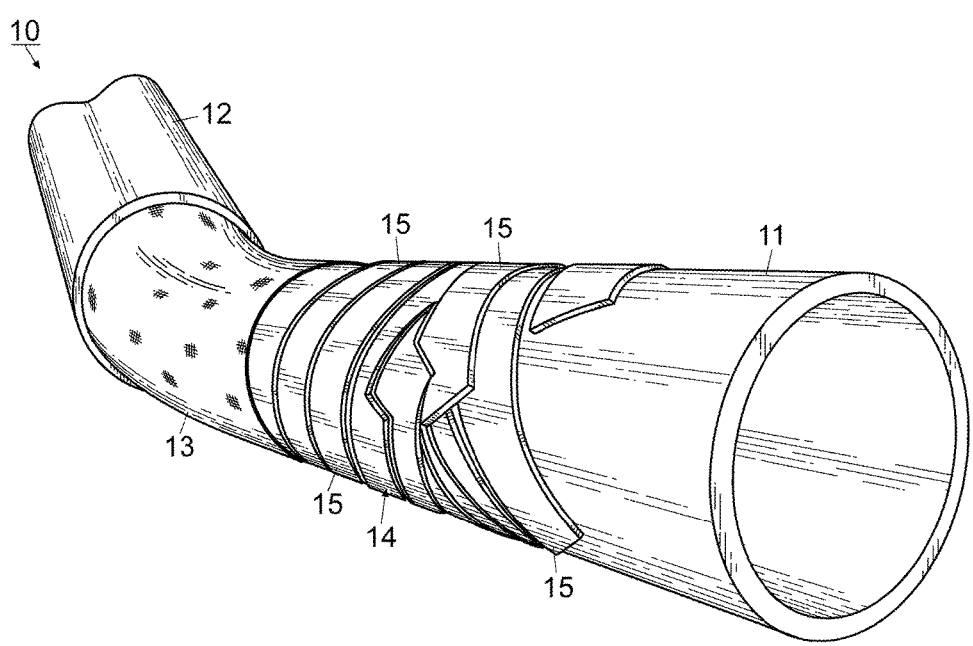
FIG. 2 pictures a side perspective view of the pipe of FIG. 1 in a second position.

For a better understanding of the invention and its operation, turning now to the drawings, FIGS. 1 and 2 illustrate side perspective views of pipe 10, including inner pipe 11, outer pipe 12 (sometimes referred to as a shield), pipe liner 13, and jacket 14. Inner pipe 11 and outer pipe 12 are each cylinders formed from a corrosion resistant polymeric material such as high density polyethylene, although other materials that are corrosion resistant and capable of withstanding prolonged heat and pressure are considered within the scope of pipes 11 and 12, respectively. Jacket 14 is preferably a flexible covering formed from metallic plates 15 which are overlappingly interwoven to permit a limited degree of rotation by pipe 10, but may also be formed from a material defined by woven glass filaments (not shown) conventionally referred to as fiberglass. When such rotation occurs, gaps (not shown) are formed between plates 15, and given the heat and pressure often present in the working environment of pipe 10, a portion of outer pipe 12 may become pliable and become inserted within the gaps. This leads to dimpling and buckling in the exterior surface of outer pipe 12, and over time may cause pipe 10 to fail.

Figure 3:
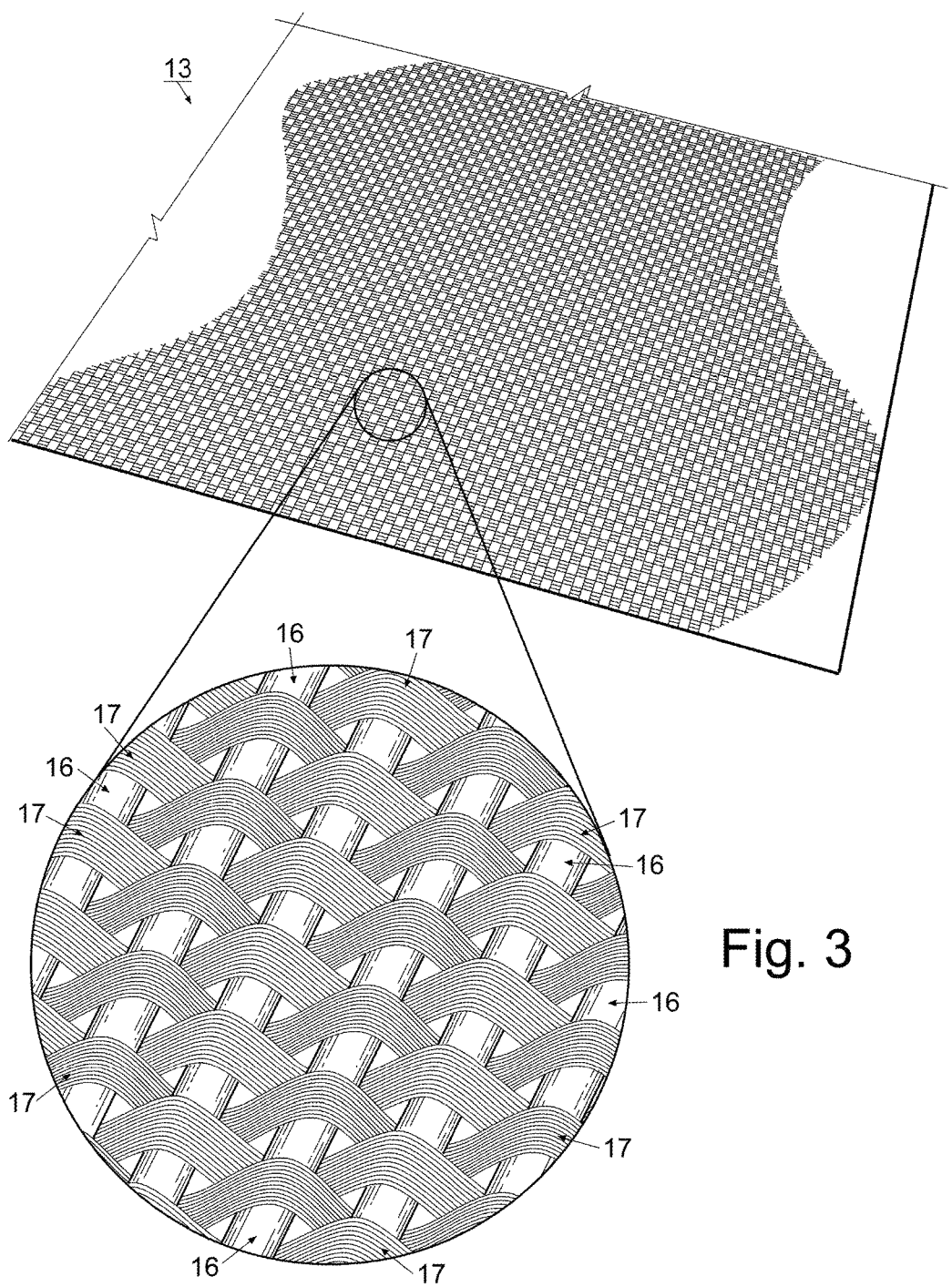
FIG. 3 depicts a side perspective view of the pipe liner of FIG. 1 with a portion magnified.
Figure 4:
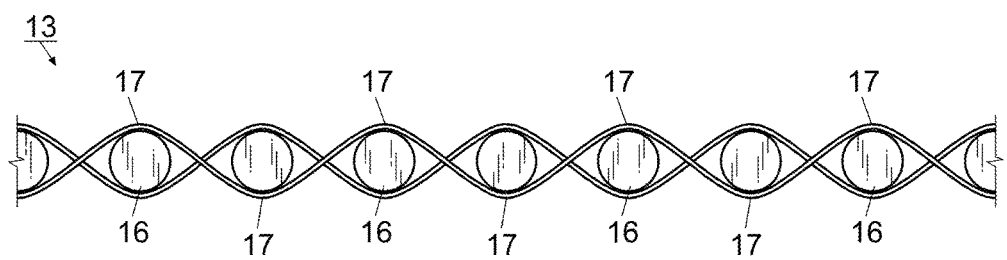
FIG. 4 demonstrates an elevated plan view of a lateral side view of the pipe liner of FIG. 1.
Figure 5:
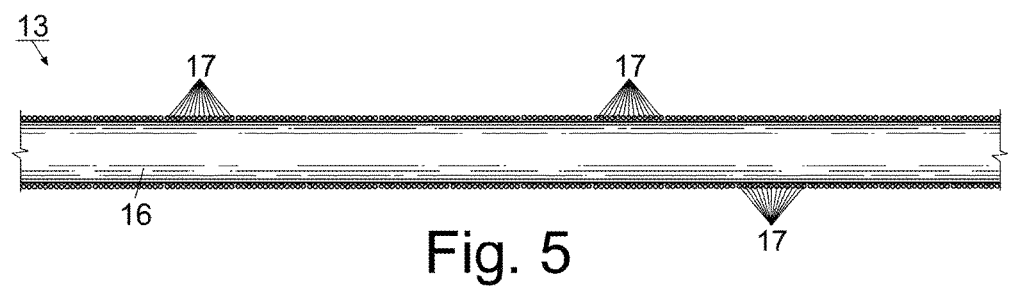
FIG. 5 illustrates an elevated plan view of a longitudinal side view of the pipe liner of FIG. 1.

For this reason, preferred pipe 10 includes cylindrical pipe liner 13 disposed longitudinally between outer pipe 12 and metal jacket 14. Pipe liner 13 as seen in FIGS. 3, 4 and 5 is preferably a woven anisotropic fabric formed from rigid, larger diameter monofilament fill strands 16 and less rigid, smaller diameter multifilament warp strands 17. Fill strands 16 define a greater modulus of stiffness than warp strands 17, resulting in a web that can be easily rolled on a spool for storage and transportation and does not sink into the aforementioned gaps but does permit the limited play described above with respect to jacket 14. Preferably, fill strands 16 are formed from polymeric material such as polyester configured into a single six hundred ten (610) denier thread (i.e. monofilament) defining a diameter of one-quarter millimeter (0.25 mm) Warp strands 17 are preferably formed from a plurality of two hundred-twenty (220) denier polyester threads, and while the exact number of threads utilized in a given warp strand 17 may vary, thirty-four (34) threads are most preferred for an efficient manufacturing process resulting in a fabric with advantageous anisotropic features.

Fill strands 16 and warp strands 17 are woven in a plain weave pattern with a straight draw as shown in FIG. 3, whereby the warp strands 17 pass laterally in alternating orientation above and below subsequent fill strands 16. Pipe liner 13 can be formed on a number of weaving machines, but preferred pipe liner 13 is woven on a weaving machine configured with highly polished reeds, heddles, and four (4) groups of drop wires (not shown), such as a two hundred-twenty centimeter (220 cm) Picanol Optimax Rapier™ weaving machine. The preferred total reed spread is seventy-eight and six hundredths of an inch (78.06") at twenty-one and an eighth (21.625) dents, with a usable reed spread of seventy-seven and a half inch (77.50") totaling one thousand six hundred eighty-eight (1688) dents and one thousand six hundred seventy-six (1676) usable dents.

As shown in FIGS. 4 and 5, unfinished edges of pipe liner 13 present the various ends of fill strands 16 and warp strands 17, respectively. FIG. 4 displays a lateral end of pipe liner 13, emphasizing the significant cross-sectional size difference between fill strands 16 and warp strands 17. FIG. 5 illustrates the multitude of threads utilized to form warp strands 17, compared to the monofilament thread defining fill strand 16. While FIGS. 4 and 5 represent unfinished edges of pipe liner 13, preferred pipe liner 13 includes treated lateral edges to prevent the woven aspect of liner 13 from coming unraveled. For example, an embodiment of pipe liner 13 includes longitudinal edges that have been hot melted and fused selvaged, which is preferred. Catchcord yarn (not shown) may also be utilized to hold fill strands 16 in place during the weaving process. The outcome of this weaving is preferred pipe liner 13 having forty-five (45) warp ends per inch and forty-five (45) fill picks per inch.

Preferred pipe liner 13 has been tested in view of the American Society for Testing and Materials (ASTM, now ASTM International), particularly for material grab tensile strength, stiffness, and cantilever stiffness (see ASTM D5034, D4032, and D1388 Option A). With a material that is approximately forty-two inches (42") wide, thirteen thousandths of an inch (0.013") thick, weighing five and fifteen hundredths of an ounce squared per yard (5.15 oz$^2$/yd), fill strands 16 and warp strands 17 forming pipe liner 13 have the following characteristics:

A one inch (1") section of fill strands 16 (approximately forty-five strands 16 per inch) defines a grab tensile strength of at least three hundred pounds force (300 lbf);

A one inch (1") section of warp strands 17 (approximately forty-five strands 17 per inch) defines a grab tensile strength of at least one hundred eighty pounds force (180 lbf);

A single-ply section folded into a four inch by by inch (4"×4") 2-ply section of fill strands 16 defines a stiffness of at least thirteen (13) newtons;

A single-ply section folded into a four inch by by inch (4"×4") 2-ply section of warp strands 17 defines a stiffness of at least fourteen (14) newtons; (same as above)

A twenty millimeter by ten inch (20 mm or 0.79"×254 mm or 10") section of fill strands 16 defines a cantilever stiffness length, determined as the bending length on an inch of material at forty-one degrees (41°, of at least five and one hundred and fifty-seven thousandths inches (5.157");

A twenty millimeter by ten inch (20 mm or 0.79"×254 mm or 10") section of warp strand 17 defines a cantilever stiffness length of at least one and twenty-four thousandths inches (1.024"), (same as above)

A twenty millimeter by ten inch (20 mm or 0.79"×254 mm or 10") section of fill strand 16 defines a cantilever stiffness strength, determined as the flexural rigidity of the material at forty-one degrees)(41°, of at least five thousand six hundred microJoules per meter (5600 uJ/m); (same as above) and A twenty millimeter by ten inch (20 mm or 0.79"×254 mm or 10") section of warp strand 17 defines a cantilever stiffness strength of at least forty-three and eight tenths microJoules per meter (43.8 uJ/m) (20 mm×10").

These test measurements are included to identify the characteristics of preferred pipe liner 13 and should not be used to restrict the scope of the instant invention. For example, it is within the scope of the instant invention to utilize fill strands 17 and warp strands 17 that define all, some, or completely different characteristics as those listed above, such as different filament and strand size, filament and strand material, strand and filament denier, and so on, as long as the resulting pipe liner 13 retains the preferred anisotropic ability. Similarly, it should be noted that one of ordinary skill in the art may utilize different mechanical components to those listed above to produce liner 13. It is understood that variation in loom type, dents per inch, and reed spread are within the scope of the instant invention.

While pipe liner 13 is described as the primary use for the web formed cylindrically from fill strands 16 and warp strands 17, a planar embodiment (not shown) of liner 13 is also contemplated within the scope of the instant invention. Formed in the same manner as described above and below, this planar liner could be used in situations where longitudinal flexibility is desirable, but lateral stability is also important. For example, fabric conveyor belts are often advantageous as a means of transporting large quantities of items in an industrial setting, as they can be manufactured and replaced for relatively low cost. However, in order to support goods while being deployed in a continuous loop, the belt must be laterally rigid to carry goods but longitudinally pliable to pass around gears, sprockets, rollers, or other drive wheels.

A method of producing pipe liner 13 includes the steps of providing a weaving machine with a highly polished reed spread of at least seventy-five inches (75") with at least twenty (20) dents per inch and configured to produce two (2) ends per dent, as well as having light weight and highly polished heddles and drop wires, for example a two hundred-twenty centimeter (220 cm) Picanol Optimax Rapier™ weaving machine. The method also includes the step of providing a plurality of six hundred ten (610) denier polyester monofilaments oriented in the fill direction to serve as fill strands 16, and a plurality of polyester warp strands 17 formed from thirty-four (34) threads of two hundred-twenty (220) denier polyester threads. The method may further include the step of providing a catchcord for positioning on opposing outboard longitudinal sides of pipe liner 13 to hold fill strands 16 and warp strands 17 in place during the weaving process. Fill strands 16 and warp strands 17 are woven together in a plain weave pattern with a straight draw, with two warp strands 17 passing alternatingly above and below each fill strand 16 until pipe liner 13 reaches a desired length. The fabric is removed from the weaving machine and assembled in panels to the desired shape, such as a cylinder.

Figure 6:
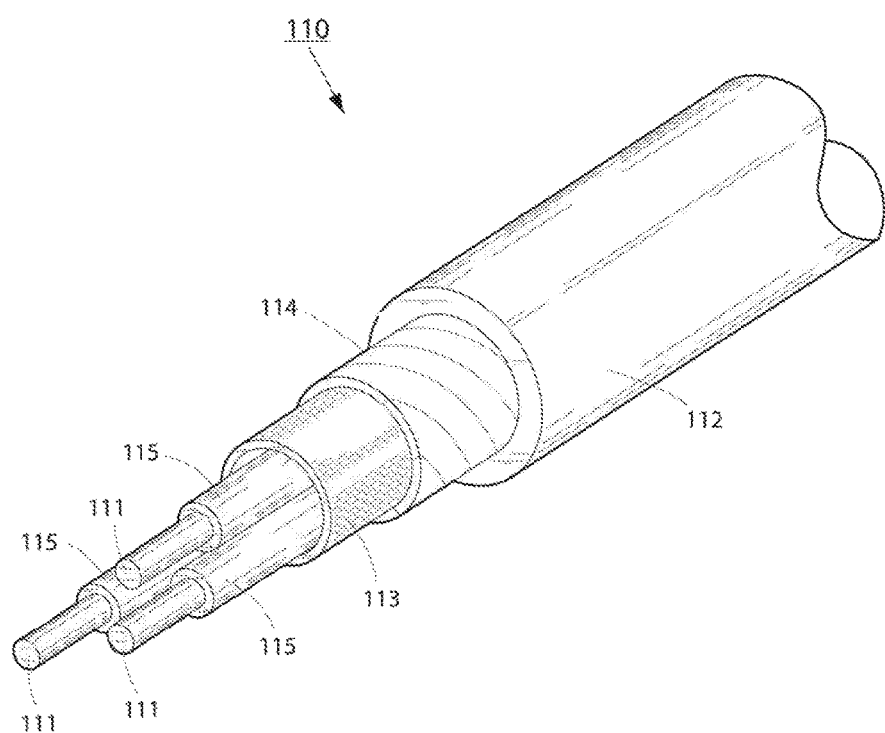
FIG. 6 shows an alternate embodiment of a wire harness incorporating the anisotropic liner.
Figure 7:
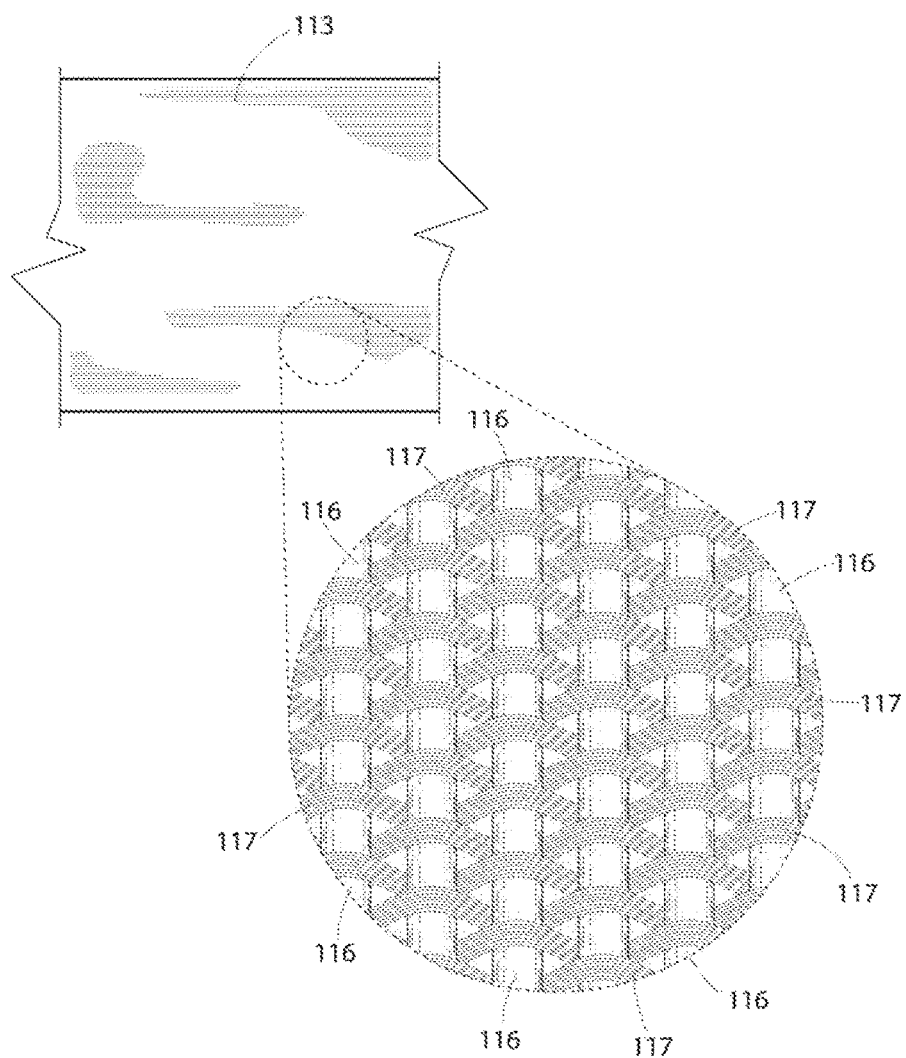
FIG. 7 pictures a side perspective view of the anisotropic liner of FIG. 6.

An alternate embodiment of anisotropic liner 113 is depicted in FIGS. 6 and 7 incorporated into wire harness 110 which includes internal wires 111 that may be bundled together and contained within liner 113. Wire harness 110 may also be known as a cable harness, cable assembly, wiring assembly, or wiring loom, and is understood to be an assembly of cables or wires that transmit signals, data, or electrical power. The material forming wires 111 is not intended to be limiting, and one of ordinary skill in the art would understand that wires 111 may be formed from any straight or twisted rods of metal, as well as straight or twisted non-metal embodiments. As illustrated, individual wires 111 may be coated with insulation 115, for example formed from a polymer material such as nylon, polyvinyl chloride (PVC), or the like. One or more embodiments may further include metal or non-metal jacket 114, some embodiments may include a woven jacket embodiment, for example a coaxial cable. Jacket 114 is preferably a flexible covering that may be overlappingly woven or interwoven to permit a limited degree of rotation by wire harness 110, but may also be formed from a material defined by woven glass filaments (not shown) conventionally referred to as fiberglass. When such rotation occurs, gaps (not shown) are formed in jacket 114 and given the friction and pressure often present in the working environment of wire harness 110, a portion of outer sheath 112 may become pliable and become inserted within the gaps. This leads to dimpling and buckling in the exterior surface of outer sheath 112, and over time may cause wire harness 110 to fail.

For this reason, preferred wire harness 110 includes anisotropic liner 113 disposed longitudinally between outer sheath 112 and jacket 114 or bundle of wires 111 if no jacket 114 is present. Anisotropic liner 113 as seen in FIGS. 6 and 7 is preferably a woven anisotropic fabric formed from rigid, larger diameter monofilament fill strands 116 and less rigid, smaller diameter multifilament warp strands 117. Fill strands 116 define a greater modulus of flexibility than warp strands 117, resulting in a web that can be easily rolled on a spool for storage and transportation and does not sink into the aforementioned gaps but does permit the limited play described above with respect to jacket 114. Preferably, fill strands 116 are formed from polymeric material such as polyester configured into a single (i.e. monofilament) thread with at least five hundred (500) denier, six hundred ten (610) denier or less, and preferably approximately five hundred sixty (560) denier. Fill strands 116 may define a diameter of one-quarter millimeter (0.25 mm) or less, a tenth of a millimeter (0.10 mm) or more, and preferably approximately three twentieths of a millimeter (0.15 mm) Warp strands 117 are preferably formed from a plurality of at least two hundred (200) denier polyester threads, two hundred thirty (230) denier or less polyester threads, and preferably approximately two hundred-twenty (220) denier threads, and while the exact number of threads utilized in a given warp strand 117 may vary, thirty-four (34) threads are most preferred for an efficient manufacturing process resulting in a fabric with advantageous anisotropic features. Alternate embodiments of anisotropic liner 13 may orient respective warp strands 117 and fill strands 116 at ninety degrees (90° or such respective strands may shift this woven angle, particularly with respect to the fill strands 116 relative to the longitudinal axis of anisotropic fabric 113. In preferred embodiments, such shifted angle versions of fabric 13 may define angles from ninety to one hundred twenty degrees (90°-120° for desirable elongation qualities that may not otherwise be found in the unbiased embodiments.

Fill strands 116 and warp strands 117 may be woven in a plain weave pattern with a straight draw as shown in FIG. 7, whereby the warp strands 117 pass laterally in alternating orientation above and below subsequent fill strands 116. Anisotropic liner 113 can be formed on a number of weaving machines, but preferred anisotropic liner 113 is woven on a weaving machine configured with highly polished reeds, heddles, and four (4) groups of drop wires (not shown), such as a two hundred-twenty centimeter (220 cm) Picanol Optimax Rapier™ weaving machine. The preferred total reed spread is seventy-eight and six hundredths of an inch (78.06") at twenty-one and an eighth (21.625) dents, with a usable reed spread of seventy-seven and a half inch (77.50") totaling one thousand six hundred eighty-eight (1688) dents and one thousand six hundred seventy-six (1676) usable dents.

Like pipe liner 13, anisotropic liner 113 has been tested in view of the American Society for Testing and Materials (ASTM, now ASTM International), particularly for material grab tensile strength, stiffness, and cantilever stiffness (see ASTM D5034, D4032, and D1388 Option A). While many of the testing metrics are approximately the same between pipe liner 13 and anisotropic liner 113, the utilization of slightly smaller diameter monofilament fill strands 116 (for example, 0.10 mm or 0.15 mm compared to 0.25 mm), altering the ratio between fill stiffness in view of the warp stiffness. For a comparison of these stiffness measurements, please see Table 1 below:

TABLE 1

| Warp Size | Cantilever Stiffness (Warp) [µj/m] | Cantilever Stiffness (Fill) [µj/m] |
| --- | --- | --- |
| 0.25 mm Monofilament | 43.8 Nominal | 5600 Nominal |
| 0.15 mm Monofilament | 42.0 Nominal | 1450 Nominal |
| 0.10 mm Monofilament | 79.1 Nominal | 175.6 Nominal |

These test measurements are included to identify the characteristics of preferred anisotropic liner 113 and should not be used to restrict the scope of the instant invention. For example, it is within the scope of the instant invention to utilize fill strands 117 and warp strands 116 that define all, some, or completely different characteristics as those listed above, such as different filament and strand size, filament and strand material, strand and filament denier, and so on, as long as the resulting anisotropic liner 113 retains the preferred anisotropic ability. Similarly, it should be noted that one of ordinary skill in the art may utilize different mechanical components to those listed above to produce liner 13. It is understood that variation in loom type, dents per inch, and reed spread are within the scope of the instant invention.

The illustrations and examples provided herein are for explanatory purposes and are not intended to limit the scope of the appended claims.

I claim:

1. A wire harness comprising an anisotropic fabric positioned between a plurality of wires and an exterior sheath, whereby the anisotropic fabric is configured to define a modulus of stiffness in the lateral direction that is greater than a modulus of stiffness in the longitudinal direction.

2. The wire harness of claim 1 whereby the exterior sheath is formed from a polymeric material.

3. The wire harness of claim 2 whereby the exterior sheath is formed from polyvinyl chloride.

4. The wire harness of claim 1 whereby the anisotropic fabric is formed from a woven yarn.

5. The wire harness of claim 1 whereby the anisotropic fabric is formed from a polyester warp material and a monofilament polyester fill material.

6. A wire harness comprising a flexible jacket positioned between an anisotropic fabric and an exterior sheath, and a plurality of wires sized to be bundled and bound within the anisotropic fabric, whereby the anisotropic fabric is configured to define a modulus of stiffness in the lateral direction that is greater than a modulus of stiffness in the longitudinal direction.

7. The wire harness of claim 6 whereby the exterior sheath is formed from a polymeric material.

8. The wire harness of claim 7 whereby the exterior sheath is formed from polyvinyl chloride.

9. The wire harness of claim 6 whereby the flexible jacket is formed from a woven material.

10. The wire harness of claim 6 whereby the anisotropic fabric is formed from a polyester.

11. The wire harness of claim 10 whereby the anisotropic fabric is formed from a monofilament polyester.

12. The wire harness of claim 11 whereby the anisotropic fabric is formed from a polyester warp material and a monofilament polyester fill material.

13. The wire harness of claim 12 whereby the polyester fill material is defined by a plurality of polyester monofilament strands each defining at least a tenth of a millimeter (0.10mm) diameter.

14. The wire harness of claim 12 whereby the polyester fill material is defined by a plurality of at least five hundred fifty (550) denier polyester monofilament strands.

15. The wire harness of claim 13 whereby the polyester warp material is defined by a plurality of polyester strands each formed from threads defining at least two hundred (200) denier.

16. The wire harness of claim 15 whereby the plurality of polyester strands are each formed from thirty-four (34) polyester threads.

* * * * *